United States Patent
Teumac et al.

(10) Patent No.: US 6,709,724 B1
(45) Date of Patent: *Mar. 23, 2004

(54) METAL CATALYZED ASCORBATE COMPOUNDS AS OXYGEN SCAVENGERS

(75) Inventors: Fred N. Teumac, Conyngham, PA (US); Bruce D. Zenner, Alameda, CA (US); Bert A. Ross, Conyngham, PA (US); Larrie A. Deardurff, Alameda, CA (US); Mahmood R. Rassouli, Hazleton, PA (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/783,714

(22) Filed: Jan. 16, 1997

Related U.S. Application Data

(63) Continuation of application No. 08/449,589, filed on May 24, 1995, now abandoned, which is a continuation of application No. 08/037,496, filed on Mar. 24, 1993, now abandoned, which is a continuation of application No. 07/518,041, filed on May 2, 1990, now abandoned.

(51) Int. Cl.$^7$ ............................................. C09K 15/00
(52) U.S. Cl. ..................... 428/34.1; 428/66.4; 426/398; 426/124; 252/400.53; 252/403; 252/188.28; 206/204
(58) Field of Search .............................. 428/34.1, 66.4; 426/398, 124; 206/294; 252/400.53, 403, 188.28

(56) References Cited

U.S. PATENT DOCUMENTS

| | | | |
|---|---|---|---|
| 2,159,985 A | 5/1939 | Gray et al. | 99/31 |
| 3,135,019 A | 6/1964 | Aichele | 18/5 |
| 3,360,827 A | 1/1968 | Aichele | 18/20 |
| 3,547,746 A | 12/1970 | Gwinner | 161/2 |
| 3,577,595 A | 5/1971 | Smith et al. | 18/20 |
| 3,586,514 A | 6/1971 | Vljbrief | 99/171 |
| 4,048,361 A | 9/1977 | Valyi | 428/35 |
| 4,211,681 A | 7/1980 | Braun et al. | 260/29.2 R |
| 4,278,718 A | 7/1981 | Billings et al. | 428/64 |
| 4,279,350 A | 7/1981 | King | 215/228 |
| 4,287,995 A | 9/1981 | Morita et al. | 215/228 |
| 4,380,597 A | 4/1983 | Erwied et al. | 524/109 |
| 4,384,972 A | 5/1983 | Nakamura et al. | 252/188.21 |
| 4,510,162 A | 4/1985 | Nezat | 426/124 |
| 4,524,015 A | 6/1985 | Takahashi et al. | 252/188.28 |
| 4,536,409 A | 8/1985 | Farrell et al. | 426/398 |
| 4,702,966 A | 10/1987 | Farrell et al. | 428/500 |
| 4,752,002 A | 6/1988 | Takahashi et al. | 206/204 |
| 4,756,436 A | 7/1988 | Morita et al. | 215/228 |
| 5,075,362 A | 12/1991 | Hofeldt et al. | 524/72 |
| 5,106,886 A | 4/1992 | Hofeldt et al. | 523/100 |
| 5,202,052 A * | 4/1993 | Zenner et al. | 252/188.28 |
| 5,270,337 A | 12/1993 | Graf | 514/499 |
| 5,284,871 A | 2/1994 | Graf | 514/499 |
| 6,391,406 B1 * | 5/2002 | Zenner et al. | 428/35.7 |

FOREIGN PATENT DOCUMENTS

| | | |
|---|---|---|
| EP | 301719 | 2/1989 |
| EP | 328336 | 8/1989 |
| EP | 328337 | 8/1989 |
| GB | 2040889 | 9/1980 |
| JP | 54-022281 | 2/1979 |
| JP | 57-194959 A * | 11/1982 |
| JP | 57-194959 | 11/1982 |
| JP | 58-160344 | 9/1983 |
| JP | 61-238836 | 10/1986 |
| JP | 62-215010 | 9/1987 |

OTHER PUBLICATIONS

The Merck Index; An encyclopedia of Chemicals and Drugs; 9th Edition; 1976; pp. 110, 111 and 1109.

*Microbial Biochemistry*, vol. 62, p. 1990 (1965).

Pfizer Technical Information Data Sheet 684, *Chemistry of Erythorbates, Erythorbic Acid, Sodium Erythorbate,* Pfizer Chemical Division (1985).

Pfizer Technical Information Data Sheet 691, *Erythorbate as a Boiler Feedwater Oxygen Scavenger,* Pfizer Chemical Division (1986).

Pfizer Information Sheet 2091, *Erythorbates in Oil Recovery Applications,* Pfizer Oil Field Products Group (1986).

Pfizer Technical Information Data Sheet 692, *Erythorbic Acid and Sodium Erythorbate in Foods,* Pfizer Chemical Division (1986).

Pfizer Information Sheet 2042, *Industrial Uses For Erythorbates and Ascorbates,* Pfizer Chemical Division.

Oxygen Eliminator Extends Shelf Life, Packaging Technology 1989.

Extending the Life of a Bottle of Beer, New York Times, Mar. 29, 1989.

ZA–matic® Model 1400 A, Zapata Industries, Inc.

Vitamins (Ascorbic Acid), Kirk Othmer Encyclopedia of Chemical Technology, vol. 29, pp. 8–35.

(List continued on next page.)

*Primary Examiner*—William P. Watkins, III
(74) *Attorney, Agent, or Firm*—Nields & Lemack

(57) ABSTRACT

An oxygen scavenging composition of a carrier, such as a polymer, which is permeable to both oxygen and water or water vapor and an oxygen scavenging compound of an organic compound or salt thereof dispersed relatively uniformly throughout the polymer in an amount effective to act as an oxygen scavenger. The oxygen scavenging compound is activated for scavenging oxygen by contact with water or water vapor which permeates into or through the carrier. Also, a catalyzing agent is included in an amount sufficient to increase the rate of oxygen scavenging by the organic compound. The organic compound and catalyzing agent are preferably maintained in a dry state by freeze drying or microencapsulation until the organic compound is activated for oxygen scavenging by contact with water or water vapor.

35 Claims, No Drawings

OTHER PUBLICATIONS

Food Additives (Antioxidants), Kirk–Othmer Encyclopedia of Chemical Technology, vol. 11, pp. 160–161.

Cort, Antioxidant Properties of Ascorbic Acid in Foods, Advances in Chemistry Series, No. 200, Ascorbic Acid: Chemistry, Metabolism and Uses, 1982, pp. 533–550.

Reinke et al, Effect of Antioxidants and Oxygen Scavengers on the Shelf Life of Canned Beer, A.S.B.C. Proceedings, 1963 pp. 175–180.

Thomson, Practical Control of Air in Beer, Brewer's Guild Journal, V. 38, No. 451, May, 1952 pp. 167–184.

Von Hodenberg, Removal of Oxygen from Brewing Liquor, Brauwelt Int'l. III, 1988, pp. 243–244.

European Packaging Newsletter and World Report, V. 21, No. 7 Jul. 1988.

Klimovitz, et al, The Impact of Various Antioxidants on Flavor Stability, *MBAA Technical Quarterly*, V. 26, pp 70–74, 1989.

Grey et al, Systematic Study of the Influence of Oxidation on Beer Flavor, A.S.B.C. Proceedings, 1948 pp. 101–112.

Folland, "The Oxbar Super–Barrier System: A Total Oxygen Barrier System for PET Packaging" presented at Europak '89 Ooctober, 1989, pp. 483–494.

A Review of the Technological Efficiency of Some Antiexidents and Synergists, by World Health Organization, 1972.

* cited by examiner

METAL CATALYZED ASCORBATE COMPOUNDS AS OXYGEN SCAVENGERS

This application is a continuation of application Ser. No. 08/449,589 filed May 24, 1995 now abandoned, which is a continuation of application Ser. No. 08/037,496 filed Mar. 24, 1993 now abandoned, which is a continuation of U.S. Ser. No. 07/518,041 filed May 2, 1990 now abandoned.

TECHNICAL FIELD

The present invention relates to a polymer compositions containing catalyzed oxygen scavenging compounds therein, for use in packaging beverages, foods, pharmaceuticals and the like. In particular, these polymer compositions have utility as liners or gasketing materials for crowns, closures, lids or caps of various containers such as bottles or cans to prevent oxygen ingress and to scavenge oxygen which is present inside the container, or contained in outside air leaking past or permeating through the polymer composition. These polymer compositions may also be used in the construction of the container, as the container material itself or as a barrier layer thereupon, to prevent oxygen ingress therethrough or to scavenge oxygen therein.

BACKGROUND ART

In packaging oxygen sensitive materials such as foodstuffs, beverages, and pharmaceuticals ("collectively products") oxygen contamination can be particularly troublesome. Care is generally taken to minimize the introduction of oxygen or to reduce the detrimental or undesirable effects of oxygen on the foodstuff or beverage.

Molecular oxygen ($O_2$) can be reduced to a variety of intermediate species by the addition of one to four electrons; these species are superoxide, hydroxy radical, hydrogen peroxide, and water. $O_2$ and water are relatively unreactive: the three intermediate species are very reactive. Also, $O_2$ can be activated to singlet electron state oxygen (which can undergo subsequent reduction to the more reactive oxygen species) by irradiation, or by the presence of catalytic agents. These reactive oxygen species are free radical in nature, and the oxidative reactions in which they participate are therefore autocatalytic.

Carbon-carbon double bonds are particularly susceptible to reaction with the intermediate species. Such carbon-carbon bonds are often found in foods and beverages, pharmaceuticals, dyes, photochemicals, adhesives, and polymer precursors. Virtually any product which has complex organic constituents will contain such carbon-carbon double bonds or other oxygen reactive components, and hence can undergo oxidative reactions. Thus, if the oxidation products adversely affect the performance, odor or flavor of the product, then removing the oxygen which is present (either dissolved in or trapped with the product), preventing oxygen ingress, or inhibiting the reactions of oxygen will benefit the product.

A number of strategies exist to deal with oxygen as a contaminant. The most basic is simply to remove oxygen from the product by vacuum or by inert gas sparging, or both. Such systems are used in boiler water treatment, the orange juice and brewing industries, and in modified-atmosphere packaging of food products. This technology, while somewhat equipment intensive, can remove about 90–95% of the oxygen present in air from the product (or its container) prior to or during packaging. However, the removal of the remaining 5–10% of oxygen using this approach requires longer times for vacuum treatment and/or sparging and increasingly larger volumes of higher and higher purity inert gas, which must not itself be contaminated with trace levels of oxygen. This makes the removal (by such methods) of the last traces of oxygen expensive. A further disadvantage of these methods is a tendency to remove volatile product components. This is a particular problem with foods and beverages, wherein such components are often responsible for some or all of the aroma and flavor.

Herein, the term "oxygen scavenger" means materials or compounds which can remove oxygen from the interior of a closed package either (a) by reacting or combining with entrapped oxygen (or with oxygen perfusing or leaking into the package) or (b) by catalyzing an oxidation reaction yielding innocuous products. The term "antioxidants" means materials or compounds which, when added to the foodstuff or beverage itself, slow the rate of oxidation or otherwise reduce the undesirable effects of oxidation upon the foodstuff or beverage.

For example, it has been known since the 1930's that oxygen in beer adversely affects its flavor and stability. Amounts of oxygen as low as 0.1 to 0.2 ml per 355 ml container will, over time, cause darkening of the beer, an increase in chill-haze values and significant taste changes. Oxygen's effect on beer is so strongly detrimental that many brewers go to great lengths to remove it from the bottle during the filling process. One usual technique is to (1) remove the air (via vacuum) from a clean bottle; (2) fill the bottle with $CO_2$; (3) flow the beer down the bottle wall into the bottle thus displacing the $CO_2$; and (4) finally, to squirt a jet of high-pressure deoxygenated water into the bottle to cause the beer to over-foam just as the cap is put on (attempting thereby to displace the remaining headspace gases with the beer's own $CO_2$). In addition, production lines are run slowly, to minimize introduction of air (21% $O_2$) into the headspace just before capping. All this is expensive, and usually reduces the total $O_2$ concentration in the headspace to only about 200–400 parts 3per billion: the desired level is as close to zero as possible, but certainly below about 50 ppb. The 200–400 ppb achieved in the packaged product by careful brewers corresponds to approximately 50–100 microliters of oxygen per 355 ml bottle. Even this small quantity of oxygen is still considered to be one of the major limitations on quality and shelf life of beer today. None of these techniques remove or control (a) oxygen dissolved in the product (which will outgas into the headspace as the enclosed system comes to equilibrium), or (b) oxygen leakage into the package past the gasket/container interface, or (c) oxygen permeating through the gasket into the interior of the package. The present invention, while primarily directed at scavenging headspace $O_2$, also aids in removal of $O_2$ from these other 3 sources. Furthermore, it is known that free oxygen inside a package may yield very rapid degradation of the product, consequently a desired property of any scavenger is to remove most of the free oxygen as quickly as possible (i.e., ultimate $O_2$ absorption capability is subordinate to fast uptake kinetics).

Antioxidants (such as sulfur dioxide, trihydroxy butyrophenone, butylated hydroxy toluene and butylated hydroxy anisole) and oxygen scavengers (such as ascorbic acid, isoascorbic acid and glucose oxidase-catalase) have been used in an attempt to reduce the effects of oxygen contamination on beer (See. e.g., Reinke et al., "Effect of Antioxidants and Oxygen Scavengers on the Shelf-life of Canned Beer, "A.S.B.C. Proceedings, 1963, pp. 175–180, Thomson, "Practical Control of Air in Beer", Brewer's Guild Journal, Vol. 38, No. 451, May, 1952, pp. 167–184, and von Hodenberg, "Removal of Oxygen from Brewing Liquor," Brauwelt International, III, 1988, pp. 243–4). The direct addition of such agents into beer has several disadvantages. Both sulfur dioxide and ascorbates, when added to beer, can result in production of off-flavors, thus negating the intended purpose of the addition. Many studies have been conducted on the effect of such agents on the flavor of beer. (See. e.g., Klimowitz et al., "The impact of Various Antioxidants on Flavor Stability," MBAA Technical Quarterly, Vol. 26, pp. 70–74, 1989 and Gray et al., "Systematic Study of the Influence of Oxidation on Beer Flavor," A.S.B.C. Proceedings, 1948, pp. 101–112.) Also, direct addition of such compounds to a food or beverage requires stating on the label that the product contains the additive. This is somewhat undesirable in today's era of "fresh" and "all-natural" products.

It is also known in the art to prepare plastic containers (e.g., for beer, other beverages and various foods) wherein a wall comprises, or includes a layer which comprises, a polymer, an oxidizable component having oxygen-scavenging properties, and a metal catalyst, for binding any oxygen penetrating the container wall (See, e.g., Folland, the OXBAR Super-Barrier System: A Total Oxygen Barrier System for PET Packaging, "EUROPAK '89, Oct. 30–Nov. 1, 1989, and European Patent Application 301,719). Also, U.S. Pat. No. 4,048,361 discloses a food container having at least one barrier layer which contains an oxygen "getter," while U.S. Pat. No. 3,586,514 discloses a thin wall polyvinyl chloride container wherein the plastic contains a quantity of an antioxidizing agent to reduce oxygen permeability therethrough, and Japanese patent application 58-160,344 discloses hollow moldings of a polyethylene terephthalate ("PET") with a meta-xylylene group containing polyamide resin. The containers described in these references are described as oxygen barriers which prevent or reduce the transmission of oxygen through the wall and into the container. Such products are generally more expensive than glass containers and are less likely to be recycled than glass or aluminum containers.

Attempts have been made to incorporate oxygen scavenging systems in a container crown or closure. For example, U.S. Pat. No. 4,279,350 discloses a closure liner which incorporates a catalyst disposed between an oxygen permeable barrier and a water absorbent backing layer.

Another closure is disclosed in UK Patent Application 2,040,889. This closure is in the form of a stopper molded from ethylene vinyl acetate ("EVA") having a closed-cell foamed core (which may contain water and sulfur dioxide to act as an oxygen scavenger) and a liquid impervious skin. Also, European Patent Application 328,336 discloses a preformed container closure element, such as a cap, removable panel or liner, formed of a polymeric matrix containing an oxygen scavenger therein. Preferred scavengers include ascorbates or isoascorbates, and their scavenging properties are activated by pasteurising or sterilizing the element after it has been fitted onto a filled container. Similarly, European Patent Application 328,337 discloses a sealing composition for a container closure comprising a polymeric matrix material which is modified by the inclusion therein of an oxygen scavenger. These compositions may be in fluid or meltable form for application to a closure or to be present as a deposit on the closure in the form of a closure gasket. Ascorbates or isoascorbates, alone or in combination with sulfites, are preferred oxygen scavengers. Again, the scavenging properties of these compounds are activated by pasteurizing or sterilizing the deposit when sealing a container with the gasket on a closure or metal cap.

Ferrous oxide has been used commercially as an oxygen scavenger for food applications. It is currently manufactured in sachets or packets by a number of firms including Mitsubishi Gas Chemical, Inc., which markets it in a product known as AGELESSR. (See, e.g., European Packaging Newsletter and World Report, Vol. 21, No. 7, July, 1988.) Such products may also contain ascorbates as an oxygen scavenging agent, per U.S. Pat. No. 4,752,002, which discloses a packaging train of a plurality of such packets. Also, U.S. Pat. No. 4,524,015 discloses the use of a granular mixture of an ascorbate or ascorbic acid, an alkali metal carbonate, an iron compound, carbon black, and water, and U.S. Pat. No. 4,384,972 discloses a foodstuff freshness keeping agent of a particulate composition that contains a salt of a metal, an alkali substance, a sulfite or other deliquescent compound, and optionally, ascorbic acid or a salt thereof.

While such products are effective at removing oxygen from within packages of breads, cookies, pasta, coffee and other relatively dry foodstuffs, they have significant drawbacks. They (a) are hygroscopic and water soluble to some extent, (b) do not function effectively in wet or moist environments, (c) function less effectively in high $CO_2$ environments, (e.g, inside beer containers), (d) must be carefully sequestered from air (or other oxygen-containing environments) until use in order to preserve their activity, and (e) they require a sachet or packet, often of multilayer construction, for proper storage and handling of the oxygen scavenger.

U.S. Pat. Nos. 4,536,409 and 4,702,966 each disclose a multilayer wall construction for a polymeric container to be used to pack comestibles, wherein outer and inner layers are structural and protective layers positioned therebetween are materials designed to control the unwanted permeation of oxygen. Preferably, the outer and inner layers are olefinic and resistant to the transmission of water vapor at room temperature, but at elevated temperatures, they permit water vapor to permeate into the oxygen absorbing system to trigger such system to an active state which is capable of absorbing oxygen. While this construction is useful from the standpoint of retaining the oxygen absorbing system in a dormant state until it is needed, such construction requires heat to render the inner and outer layers permeable to water vapor which can trigger or activate the oxygen absorbing system.

Consequently, there is a need for a material or product which can rapidly reduce oxygen levels inside a package of products which are wet or moist (or which are capable of generating moisture inside their packaging) without adversely changing taste, aroma, or functionality of such packaged foodstuffs, beverages and pharmaceuticals. Persons skilled in the art have considered the addition of various agents into the packaging of such products in an attempt to meet this need.

Japanese patent application 61-238,836 discloses a packaging film made from a thermoplastic such as low density polyethylene ("PE"), which includes ascorbic acid alone or in combination with an aliphatic polycarboxylic acid. This film is disclosed as having good gas barrier properties.

Japanese patent application 54-022,281 discloses a fruit tray made of a thermoplastic foam base having a thin layer of ascorbic acid or erythorbic acid (or one of their alkali metal salts) on the face of indentations in the tray upon which the fruit is to be placed.

New oxygen absorbing and scavenging materials are also being developed by Aquanautics, Inc., Alameda, Calif. (See Packaging Technology, "Oxygen Eliminator Extends Shelf Life," 1989 and "Extending the Life of a Bottle of Beer," New York Times, 3/29/89). These materials are transition metal complexes, particularly (but not exclusively) those complexes formed between transition metals and "polyalkylamines" (as disclosed in U.S. Pat. No. 4,959,135 which is expressly incorporated herein by reference thereto), as well as those complexes formed between transition metals and "macrocyclic amines" (as disclosed in U.S. Pat. No. 4,952,248 which is expressly incorporated herein by reference thereto).

These "amine+metal" complexes can bind ligands such as oxygen and can be used as oxygen scavengers in packaging. The complexes either do not form or do not become activated (i.e., cannot, or do not, bind oxygen) until the amine and metal are together exposed to water or water vapor. The ingredients of the complex can be mixed and used either free, or immobilized on or within a support inter alia, on or mixed with silicone rubber or with a polymer such as polyvinyl chloride ("PVC"), EVA, polypropylene ("PP"), PE or polyurethane (See, e.g., U.S. patent application Ser. No. 07/317,172, filed Feb. 28, 1989, the content of which is expressly incorporated herein by reference thereto, wherein one use for such complexes is as an oxygen scavenger in sealing compositions and structures for beer bottle crowns).

U.S. Pat. No. 4,287,995 discloses a sealing member for a container which is used to preserve aqueous liquids therein. This sealing member is mounted on the cap or stopper of the container on the portion facing the contents. The sealing member contains an oxygen adsorbent which is separated from contacting the contents of the container by a film which has a plurality of fine openings such that it is gas-permeable but water-impermeable at one atmosphere pressure.

U.S. Pat. No. 4,510,162 discloses an oxygen adsorbent composition comprising iron particles, yeast and moisture, which is mounted on a suitable carrier and adapted to be mounted in a closable container for removing oxygen therefrom.

U.S. Pat. No. 4,756,436 discloses a construction for an oxygen scavenging composition to be installed in a cap upon a liquid substance containing vessel. This construction includes an upper, vacant compartment, a lower compartment containing the oxygen scavenger, and a partition therebetween. The partition is made of single or plural sheets of gas permeable liquid-proof material to provide a barrier between the oxygen scavenger and the liquid substance.

Current crown liner technology includes the in situ molding of a thermoplastic liner material directly in the crown which will later be used for bottling beer or other beverages. Such liners are primarily made of PVC in the United States and of thermoplastics which do not contain chlorine (such as EVA or PE) in Europe and Japan. The manufacture of such crowns and liners is described below.

A conventional apparatus for making lined crowns is the Za-Matic® Model 1400A (available from Zapata Industries, Inc.) described in U.S. Pat. Nos. 3,135,019, 3,360,827 and 3,577,595. The liner compositions may be based upon plastics such as, for example, PVC, EVA, or PE, and may include those of U.S. Pat. No. 3,547,746, for example. The Za-Matic® 1400A machine is a shell lining machine which works as follows: the machine orients lacquered flat crown blanks (known as shells) with the lacquer side up (the lacquered side will become the inside of the finished crown). It feeds shells out of a hopper into a chute, from which the shells enter into a conveying turret which rotates.

The rotating turret and shells pass through the induction heating work coil of the machine. Induction heating raises the temperature of the shells to roughly 325 F. The shell, in turn, heats the inside lacquer coating to the same temperature. At this temperature, the polymer to be used as liner material will fuse tightly to any other similar material (e.g., the lacquer). As the hot shell travels with the turret, it passes under an extruder. The extruder takes the appropriate dry blend compound or pellets (generally of a polymer such as PVC, EVA or PE) into its intake end, and through the barrel of the extruder, wherein the compound is melted to the completely cured stage (approximately 375 F) before it is extruded through a hole in the extender face plate. A rotating knife runs against the face plate in synchrony with the passing hot shells. As the extruded polymer comes out of the hole, the knife blade cuts off the extrusion and places it in the shell cavity. The hot pellet hits and sticks to the hot lacquer of the shell.

The turret continues to rotate, carrying the hot shell with the hot compound pellet in it to the second, or "molding" turret. The molding turret contains molding punch and anvil assemblies. These anvils are positioned so that each shell is carried into the flat surface of an anvil. The anvils are heated at all times to roughly 240 F. The molding turret centers each blank on an anvil, and the molding punch assembly is driven downwards to a set height. This compresses the hot compound in the hot shell to conform to the liner design of the molding tools. The compound and lacquer are at the proper temperature for fusion, thus bonding the molded liner to the interior lacquer of the hot shell. The molding punches are water-cooled to remain cold at all times. As the molding tools squeeze and mold the hot compound to the hot shells, the inward surface of the liner compound is being chilled to keep the compound from sticking to the molding punch and to chill or set the compound in its molded form. The finished crown is discharged down a chute onto an inspection belt.

In addition to this crown liner manufacturing method, which is generally used for PVC, EVA or PE liners, many other devices can apply liners by plastisol spin-lining or various hot molding techniques. PVC compositions, with or without additives as stabilizers or for imparting certain properties, are known in the art. For example, U.S. Pat. No. 4,380,597 discloses a stabilized thermoplastic composition of PVC (or mixed polymers) which may include ascorbates or gluconates as stabilizer additives. These stabilizers are added not to absorb oxygen from inside packages made of the polymer, but to prevent breakdown of the polymer itself. U.S. Pat. No. 4,211,681 discloses shaped articles (e.g., films or tubes) which include high molecular weight poly (ethylene oxide) polymers with stabilizers of ascorbic acid, 2,3-butyl hydroxyanisoles, and the like.

Japanese patent application 62-215,010 discloses a deodorizing fiber obtained by treating thermoplastic fibers with inorganic particles of divalent ferrous iron and L-ascorbic acid. U.S. Pat. No. 4,278,718 discloses a sealing composition for beverage containers consisting essentially of a vinyl chloride resin, a plasticizer, and a metal oxide.

Today there is a need for oxygen-scavenging thermoplastic compositions for use in oxygen-scavenging systems for packaging beverages, foods, pharmaceuticals and other products. The oxygen-scavengers in such systems should rapidly reduce oxygen levels within the package (and/or in the goods themselves), as well as prevent air (i.e., oxygen) ingress into the package. There is a particular need for such systems where the internal environment of the package is (or can become) wet or moist. Most advantageously, the oxygen-scavengers of such systems would remain inactive until after the product is packaged. One particular need for such a composition is a liner for beer bottle crowns wherein the oxygen-scavenging properties of the liner do not become active until after the bottle is crowned. The present invention provides certain compositions and formulations as solutions to these general needs, and specifically for bottled beverages including beer.

SUMMARY OF THE INVENTION

This invention teaches the preparation and use of certain oxygen scavenging materials dispersed in various carriers, such as polymers or plastics, and used in packaging as oxygen scavenging compositions. These compositions, by virtue of novel and unexpected increases in oxygen uptake rates of the oxygen scavenging material, are useful in deterioration or reaction of the packaged substances due to exposure to oxygen in the package.

The invention relates to oxygen scavenging compositions comprising a carrier, such as a polymer and preferably a thermoplastic polymer, which is permeable to oxygen and water or water vapor; an organic compound, capable of reacting with oxygen and being dispersed relatively uniformly through the carrier, added in an amount sufficient to act as an effective oxygen scavenger; and a catalyzing agent in an amount sufficient to increase the rate of oxygen uptake by the organic compound in order to provide rapid initial oxygen scavenging.

Preferred organic compounds include D- or L-ascorbic acid or a salt or fatty acid derivative thereof (i.e., D- or L-ascorbates). Isoascorbates or erythrobates may also be used, but most preferably, the organic compound is sodium L-ascorbate, since it is readily available and known to be safe for contact with foodstuffs or beverages.

The catalyzing agents for such oxidizable organic compounds include any transition metal, compound, complex or chelate. More preferably the transition metal is chosen from the group comprising iron, copper, cobalt, or nickel, and most preferably it is either iron or copper. The transition metal may preferably be supplied either (1) as a compound such as an ordinary salt, or (2) as a polyalkylpolyamine ("PAPA") chelate, macrocyclic amine ("macrocycle") chelate, or an amino polycarboxylate chelate of a transition metal ion. It is also possible to utilize other transition metal chelates which contain one or more amine, hydroxyl, carboxylate or sulfhydryl groups, or combinations thereof.

Simple transition metal salts, such as ferrous or ferric chloride, cuprous or cupric chloride, ferrous or cupric sulfate, ferrous gluconate, nickel sulfate, or cobalt chloride, are more preferable, and cupric sulfate is most preferred. The chelated-transition metal amines are particularly useful because, when utilized in the appropriate amounts, they possess oxygen scavenging properties which augment the oxygen scavenging properties of the ascorbate compound, thus making the metal chelate a secondary scavenging compound. Also, the transition metal ion in the complex can catalyze the oxygen scavenging activity of the ascorbate compound. Of the chelated ion complexes, the polyalkylpolyamines are preferable; more preferable are those which have symmetrical-length carbon chains between adjacent nitrogen atoms, and most preferable are those wherein each such chain comprises between one and four, and optimally two, carbon atoms. Transition metal chelates of ethylene diamine tetracetic acid ("EDTA") can also be used, such as $Fe^{++}/EDTA/(2Na^+)$.

Preferred carriers include polyolefins, PVC, polyurethanes, polyamides and elastomers. PVC, EVA and PET are typically utilized, but PE, PP, and other olefins, various thermoplastic (or other) polyurethanes, elastomers, such as isoprene rubber, nitrile rubber, chloroprene rubber, silicone rubber, or other rubber analogs, and other thermoplastic materials such as chlorinated polyethylene ("CPE"), SURLYN, or various combinations or mixtures thereof, are acceptable. In addition, coatings of epoxies, polyesters or other materials are useful as carriers for the oxygen scavenging compositions of the invention.

The most preferred polymers which may be used as the carrier (e.g., PVC, EVA, PE or polyurethane) are those which are pervious to water vapor at room temperature, so that exposure to elevated temperatures is not necessary to activate the oxygen scavenging capabilities of the composition. The oxygen scavenging organic compound and catalyzing agent are uniformly dispersed in and throughout the polymer by a direct mixing technique. Advantageously, the organic compound and catalyzing agent are mixed or blended into the carrier in a dry state either The oxygen scavenging capabilities of these materials are later activated by contact with water or water vapor which permeates into or through the carrier.

Another embodiment of the invention relates to a package (for, e.g., a foodstuff, beverage, or pharmaceutical product) comprising means for supporting or retaining the product, and an oxygen scavenging composition of an oxidizable organic compound and a catalyzing agent in contact with the product (or in contact with the environment between the product and the package) for scavenging oxygen therefrom so as to avoid detrimental effects to the performance, odor or flavor properties of the product.

The oxygen scavenging composition may be present on an inside surface of the product supporting or retaining means. Such means can be in the form of a polymer film, with the oxygen scavenging composition being dispersed relatively uniformly throughout the polymer film. If desired, a plurality of polymer films may be used, with at least one layer of adhesive or binder therebetween, with the oxygen scavenging composition being present in at least one of the polymer films or layers. Also, the oxygen scavenging composition can be applied as a coating or lining upon the inside surface of the product supporting or retaining means to function as a barrier to oxygen permeation.

The invention also relates to containers for water-containing foodstuff, beverage, chemical or pharmaceutical products comprising means for retaining the product and having at least one opening therein for filling or dispensing of the product; a member for closing the opening and preventing escape of the liquid product when not desired; and a liner or gasket comprising one of the oxygen scavenging compositions described above and being positioned adjacent the closing member. Preferably, the retaining means is a bottle, the closing member is a crown or closure, and the polymer of the liner or gasket comprises a polyurethane PVC, EVA or PE. The retaining means may also be a metal can or glass jar, with the closing member being a lid therefore. In this variation, the oxygen scavenging composition may be applied to the lid in the form of a ring, a spot, or coating. Also, the oxygen scavenging composition may be applied to the interior of the can as a coating, generally of an epoxy or polyester carrier. When a metal can is used, it is usually provided with a seam. Thus, it is desirable to apply the oxygen scavenging compositions of the invention as a sealant in or upon the seam to prevent oxygen ingress into the can through the seam. Another embodiment of the invention relates to an oxygen scavenging container which may be made from any one of the compositions of the invention described above.

DETAILED DESCRIPTION OF THE INVENTION

The oxygen scavenging compositions of the invention include certain preferred combinations of oxygen scavenging and catalyzing agents which are added to and dispersed in and throughout a polymer carrier for these agents.

Preferred oxygen scavenging agents include any oxidizable organic compounds, such as organic acids, but most preferred are the ascorbate compounds. The term "ascorbate compound" is used to include ascorbic acid in either its D or L form and any derivative, analog or salt thereof, including erythorbic acid. In particular, D- or L-ascorbic acid, their sodium, potassium or calcium salts, or fatty acid derivatives thereof may be used in this invention. The sodium salts are particularly preferred since these materials are widely, accepted for contact with food and have achieved "Generally Recognized As Safe" (or "GRAS") status with the U.S. Food and Drug Administration for such applications.

It has been found that the ascorbate compound does not become active for scavenging oxygen until it contacts water or water vapor. Thus, the ascorbate compound is dispersed relatively uniformly throughout a polymer carrier which is permeable both to oxygen and water or water vapor. Thereafter, when the polymer is used in an application adjacent to or in the vicinity of a water bearing foodstuff, pharmaceutical, chemical, or beverage, water or water vapor will permeate into the polymer and thus activate the ascorbate compound for removal of oxygen. By retaining the polymer in a dry environment prior to use, the ascorbate compound will remain essentially dormant until activated.

The inclusion of a catalyzing agent in the compositions of the invention greatly enhances the rate of oxygen scavenging by the ascorbate compound after the ascorbate compound is activated by exposure to water or water vapor. It has been found that a transition metal compound, in the form of an organic or inorganic salt, or as a complex or chelant, is useful in accelerating (i.e., catalyzing) the rate of oxygen scavenging by the ascorbate compound. It is more preferred to use a simple iron or copper salt such as iron chloride or copper sulfate and to mix the same with the ascorbate compound for uniform dispersion throughout the polymer.

The combination of the ascorbate and transition metal compounds enables the ascorbate compound to be oxidized rapidly at low pH values (e.g. at pH values between 4 and 5) which are typically encountered in bottled beer.

A wide variety of polymers (or mixtures thereof) may be used in accordance with the teachings of the present invention. For use in applications such as crown or closure liners, the polymer is preferably a thermoplastic, such as PVC, EVA, PET, PE or PP, or a polyurethane. As noted above, PVC liners are well known for use in crowns as described in the production of same utilizing the Za-Matic machines. There is also well-known technology for making aluminum or plastic closures containing EVA liners. Thus, one of the preferred uses of the compositions of the inventions is as a liner or gasket in a crown or closure for capping a beverage bottle.

In addition to its use as a crown or closure liner, the compositions of the invention may also be used in the form of a film for packaging materials. Such films are preferably made of PE, PP, PVC, or SURLYN, a DuPont Corporation polymer. The oxygen scavenging compositions of the invention could also be used for forming containers; in this situation the polymer is preferably PET, PVC, or PE. Other polymers which are contemplated by the invention include silicones as well as elastomers such as isoprene rubber and its rubber-like analogs: nitrile rubber, chloroprene, EPDM, etc. Silicone rubber can also be used in some situations. The only requirements of the polymer are that it can be processed in a manner which allows the ascorbate and transition metal compounds to be dispersed relatively uniformly throughout and that the polymer be permeable to oxygen and water or water vapor.

Another application of the compositions of the invention would be as a sachet, packet or pellet which is mounted on a support and then attached to a crown or other container lid in the form of an article, such as a ring or spot, or as a coating. Thus, the compositions can be applied to a wide variety of jar lids and caps which are used for retaining food substances therein. Again, however, the preferred uses of the compositions of the invention are in connection with foodstuffs which contain water so that the oxygen seavening compound may be activated by contact with water or water vapor which permeates into the polymer.

Other uses for the compositions of the invention include use on metal (i.e., aluminum or tinplate) cans for beverages. In these cans, the lid is attached by a seam, and a sealant compound is used in the seam to prevent the ingress of air into the can. The oxygen scavenging compositions of the invention may be applied to this seam as or incoprated into the sealant.

It is also contemplated to prepare plastic bottles from the compositions of the invention. In particular, PVC and PET are the preferred polymers for this embodiment, and the oxygen scavenging compound and catalyzing agent would be dispersed uniformly throughout the PVC or PET resin. Thereafter, the bottles can be molded in the conventional manner known in the art.

Another preferred use of the composition of the invention is as a gasket or liner applied to an aluminum or plastic closure or metal crown for plastic or glass bottles.

For crown liner manufacture, the disclosure of U.S. Pat. No. 3,547,746 is useful and thus is expressly incorporated herein by reference thereto. The thermoplastic resins which are preferred for use as the polymer in the oxygen scavenging compositions of the invention are set forth in/t-he patent at column 2, lines 35 through 47.

The '746 patent also discloses suitable plasticizer compounds which may be used with the thermoplastic resin along with preferred ranges thereof. In this invention, it is preferred to use an amount of plasticizer ranging from about 60 to 90 parts by weight based on 100 weight parts by weight of the polymer for crown liners. Depending upon the specific product to be made, the amount of plasticizer can vary from 10 to 120 parts. Specific plasticizers for PVC crown liners are recited in column 5, lines 49 through 53 of the '746 patent. Other conventional additives such as stabilizers, lubricants, pigments, etc. are well known in the art and may optionally be used in the compositions of the present invention.

In these formulations, it is preferred to use an amount of oxygen scavenging compound ranging from about 0.1 to 20, preferably 1 to 12 parts by weight based on a 100 parts by weight of the polymer (i.e., between 10 and 1000, and preferably 50 and 600 $\mu$moles of scavenger compound per gram of polymer for compounds having molecular weights of between 200 and 500 grams per mole). The catalyzing agent of the transition metal element compound or complex may be used in an amount of about 0.002 to 0.5 parts by weight based on 100 parts by weight of the polymer (i.e., between 0.1 and 10 $\mu$moles per gram of polymer).

If desired, a PAPA chelate, macrocyclic chelate or amino polycarboxylic acid chelate of a transition metal ion can be used as the catalyzing agent in the compositions of this invention. These transition metal chelates may also be used to augment the oxygen scavenging properties of the ascorbate compounds. To do so, such chelates would be used in an amount of between about 0.3 and 33 and preferably, 2.5 to 15 parts per weight based on 100 parts by weight of the polymer (i.e, between 10 and 500, and preferably 50 to 300 μ moles per gram of polymer). Preferred transition metal chelates include polyalkyl polyamines or macrocyclic amine chelates of transition metal ions such as iron, copper, nickel or cobalt. In these polyalkyl polyamine chelates, equal length carbon chains are utilized between adjacent nitrogen atoms, preferably those chains having between 1 and 4 and optimally 2 carbon atoms.

Other transition metal chelates containing one or more amine, hydroxyl, carboxylate or sulfhydryl groups, or combinations thereof, may be used. Amino polycarboxylates, such as EDTA, and other polycarboxylates, optionally containing hydroxyl moieties, are representative examples of suitable compounds. Hydroxyethylene diamine triacetic acid, diethylene triamine pentaacetic acid, or trans-1,2-diamino cyclohexane tetraacetic acid can be used. As noted above, however, $Fe^{++}/EDTA/(2Na+)$ is the most preferred chelate.

In another embodiment of the invention, the oxygen scavenging and catalyzing agents may be treated to maintain these agents in a dry state before they are dispersed relatively uniformly throughout the polymer. Numerous methods are known for maintaining this dry state, and freeze drying, spray drying, or microencapsulation are preferred due to simplicity of processing. Thereafter, the oxygen scavenging compound will be activated by contact with water or water vapor which permeates into the polymer.

Techniques for freeze drying are well known in the art. In the present invention, the oxygen scavenging agent (alone or with the catalyzing agent) is mixed in a flask under an inert gas atmosphere with deoxygenated water to form a solution, the solution is frozen and the frozen solution is then freeze dried using, e.g., a Labconco 77520 benchtop freeze dryer until all water is removed from the flask. The freeze dried material is then dispersed throughout the polymer prior to processing the polymer into the final configuration.

Microencapsulation techniques are also well known in the art. The oxygen scavenging agent (alone or with the catalyzing agent) is enclosed within microcapsules that are relatively impervious to oxygen and/or water vapor. The encapsulating material is selected to provide the desired properties to the oxygen scavenging agent. If the encapsulating material is pervious to water or water vapor, the encapsulated agent must be maintained in a dry environment until the time of use. In contrast, an oxygen and water impervious encapsulant may be used for compositions whereby later processing of the polymer causes physical rupture of the microcapsules and exposure of the oxygen scavenging agent to the oxygen and water or water vapor which permeates the polymer. One skilled in the art can select the appropriate encapsulant for the intended application.

After freeze drying, spray drying, or microencapsulation, the materials are then blended with the appropriate polymer and manufactured into the final composition, form and configuration for use in, on or as the product packaging.

EXAMPLES

The following examples illustrate preferred embodiments of the invention. In each example, the formulation components are designated in parts by weight unless otherwise indicated.

Example 1

Procedure for Oxygen Measurement Using Gas Sampling Tubes and the Gas Chromatograph/Mass Spectrometer.

A known weight (generally 1 gram) of polymer or material to be tested is introduced into a 250 ml gas sampling tube. New O-ring seals and septum are used for each specimen. The gas tube is then flushed with a standard gas until the tube is filled. The gas tube is allowed to sit 1 hour and then is connected to the system. Two or three samples of gas are loaded from the tube into the gas chromatograph. To check for any leaks, which may have developed after filling, and to establish a baseline oxygen/nitrogen ratio. If the tube is stable and no leaks are detected, a specified amount of distilled water is introduced into the tube, generally 0.5–1 ml. The gas mixture in the tube is sampled periodically, loaded onto the gas chromatograph and evaluated for oxygen scavenging activity.

Example 2

Proof of Principle

To demonstrate the unexpected advantages of the present invention, the following compositions were prepared and tested.

Experimental oxygen scavenging polymeric compounds of this invention were prepared in one of two ways. For purposes of screening compounds, a PVC dry blend containing the oxygen scavenging material was prepared using techniques known to one skilled in the art. This dry blend was then fused and sheeted out into a film 0.035 inches ±0.05 inches thick on a two roll rubber mill at 300–340° F. Samples were then cut and weighed from this sheet for introduction into the gas sampling tubes for oxygen uptake measurements.

Compounds showing exceptional activity were prepared by a second method for confirmation. This method involved making a dry blend, extruding the dry blend and molding the extrudate into a liner as described above in the specification. Activity was measured by removing the liner from the metal shell, placing it into the gas sampling tube, and monitoring as described above with a gas chromatography mass spectrometer.

One gram of each of these PVC samples was tested for rate of oxygen uptake. The amount of scavenger and catalyst in these samples, along with the oxygen removal results are shown below in Table I.

TABLE I

| | | Sample (μmoles) | | | | |
| --- | --- | --- | --- | --- | --- | --- |
| Component | Control | A | B | C | D | E |
| Sodium Ascorbate | — | 200 | 200 | 200 | 200 | 200 |
| FeCl$_2$ | — | — | 5 | — | — | — |
| CuSO$_4$ | — | — | — | 5 | — | — |
| Ferrous EDTA | — | — | — | — | 5 | — |
| Cuprous EDTA | — | — | — | — | — | 5 |
| 24 Hour Oxygen Uptake (μmoles/g polymer) | 1.21 | 2.7 | 15.96 | 8.5 | 11.73 | 15.12 |

These results show that transition metal catalyzed sodium ascorbate has over 300 to 600% better oxygen uptake rates compared to the ascorbate alone, and that the PVC liner control (no ascorbate) does not scavenge any significant amount of oxygen.

Next, crown liners were prepared from PVC resin containing the oxygen scavenging and catalyzing agents shown in Table 2. These liners were placed in bottle crowns which were then used to cap fresh bottled beer. Oxygen measurements were made in six replicate samples immediately after sealing and pasteurizing the bottles ("initial" value), and again after seven days of storage at room temperature ("control" value). These oxygen measurements were made using a polarographic oxygen probe device from Orbisphere, Inc. Results are shown below in Table II.

TABLE II

| | | Sample ($\mu$moles) | | | | |
|---|---|---|---|---|---|---|
| Component | Initial | Control | A | B | C | D |
| Sodium Ascorbate | — | — | 50 | 112.5 | 250 | 250 |
| FeCl$_2$ | — | — | 5 | 5 | 5 | — |
| CuSO$_4$ | — | — | — | — | — | 5 |
| Oxygen Content (7 days-ppb) | 415.4 | 229.1 | 135.1 | 106.6 | 83.2 | 121.4 |

These data show that beer, itself, consumes oxygen, which is one cause for the normal limited shelf life of this product. The use of a crown liner made of one of the polymer compositions of the invention results in removal of oxygen over that which is normally consumed by the beer. Moreover, the greater amount of ascorbate used, the greater the amount of oxygen that is removed.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A moisture-activated oxygen scavenging composition comprising a polymeric carrier which is permeable to both oxygen and either water or water vapor; an ascorbate compound which is capable of reacting with oxygen after activation with water or water vapor which permeates the carrier; and a catalyzing agent in an amount effective to increase the rate of reaction of said ascorbate compound with oxygen which permeates through or into the carrier, said ascorbate compound and said catalyzing agent being dispersed relatively uniformly as separate components throughout said polymeric carrier; said composition being anhydrous and thereby dormant and substantially non-reactive with oxygen until moisture activated.

2. The composition of claim 1, wherein the ascorbate compound is D- or L-ascorbic acid or a salt or a fatty acid derivative thereof.

3. The composition of claim 1 wherein the carrier is a polyolefin, polyvinyl chloride, polyurethane, polyamide, an elastomer, or a mixture thereof.

4. The composition of claim 1 wherein the catalyzing agent is a transition metal compund, complex or chelate.

5. The composition of claim 1 wherein the catalyzing agent includes iron, copper, nickel or cobalt.

6. The composition of claim 1 wherein the catalyzing agent is a polyalkylamine chelate of a transition metal, a macrocyclic-amine chelate of a transition metal, or an amino polycarboxylic acid chelate of a transition metal.

7. The composition of claim 1 wherein the catalyzing agent has been treated to be in a dry state.

8. The composition of claim 7 wherein the dry state is achieved by one of freeze drying, spray drying or microencapsulation.

9. The composition of claim 1 wherein the ascorbate compound is present in an amount of about 0.1 to 20 parts by weight based on 100 parts by weight of the carrier, and the catalyzing agent is present in an amount of about 0.002 to 0.5 parts by weight based on 100 parts by weight of the carrier.

10. The composition of claim 1 wherein the ascorbate compound is present in an amount of about 100 to 1000 $\mu$moles per gram of carrier, and the catalyzing agent is present in an amount of about 0.1 and 10 $\mu$moles per gram of carrier.

11. A moisture-activated oxygen scavenging composition comprising a polymer which is permeable to both oxygen and either water or water vapor; an ascorbate compound in an amount effective to act as an oxygen scavenger; and a catalyzing agent in an amount sufficient to increase the rate of oxygen scavenging by the ascorbate compound, said ascorbate compound and said catalyzing agent being dispersed relatively uniformly as separate components throughout said polymer; wherein said ascorbate compound is activated for scavenging oxygen by contact with water or water vapor which permeates said polymer; said composition being anhydrous and thereby dormant and substantially non-reactive with oxygen until moisture activated.

12. The composition of claim 11, wherein the ascorbate compound is D- or L-ascorbic acid or a salt or fatty acid derivative thereof.

13. The composition of claim 11 wherein the ascorbate compound is a sodium, potassium or calcium salt of D- or L-ascorbic acid or a fatty acid derivative thereof.

14. The composition of claim 4 wherein the ascorbate compound is present in an amount of about 0.1 to 20 parts by weight based on 100 parts by weight of the carrier, and the catalyzing agent is present in an amount of about 0.002 to 0.5 parts by weight based on 100 parts by weight of the carrier.

15. The composition of claim 4 wherein the ascorbate compound is present in an amount of about 100 to 1000 $\mu$moles per gram of carrier, and the catalyzing agent is present in an amount of about 0.1 and 10 $\mu$moles per gram of carrier.

16. The composition of claim 11 wherein the catalyzing agent is a transition metal compound, complex or chelate.

17. The composition of claim 16 wherein the transition metal is iron, copper, nickel or cobalt.

18. The composition of claim 11 wherein the transition metal compound is supplied as a sulfate or chloride salt.

19. The composition of claim 18 wherein the transition metal compound is iron sulfate, iron chloride or copper sulfate, and is used in an amount of about 0.002 to 0.5 parts by weight of the polymer.

20. The composition of claim 16 herein the catalyzing agent is present in an amount of about 0.1 to 10 $\mu$moles per gram of polymer.

21. The composition of claim 16 wherein the transition metal complex is a polyalkylamine chelate of a transition metal, a macrocyclic amine chelate of a transition metal, or an amino polycarboxylic acid chelate of a transition metal.

22. The composition of claim 11 wherein the polymer is a polyolefin, polyvinyl chloride, polyurethane, polyamide, an elastomer, or mixtures thereof.

23. The composition of claim 11 wherein the polymer is polyvinyl chloride, ethylene vinyl acetate, polyethylene, chlorinated polyethylene, a polyurethane or polyethylene terephthalate, and the amount of ascorbate compound is about 0.1 to 12 parts by weight based on 100 parts by weight of the polymer.

24. The composition of claim 23 further comprising a plasticizer in an amount of 10 to 120 parts by weight based on 100 parts by weight of the polymer.

25. The composition of claim 24 wherein the catalyzing agent is present in an amount of about 0.002 to 0.5 parts by weight based on 100 parts by weight of the polymer.

26. The composition of claim 25 wherein the chelate is present in an amount of about 0.3 to 33 parts by weight based on 100 parts by weight of the polymer.

27. The composition of claim 25 wherein the chelate is present in an amount of about 10 and 500 μmoles per gram of polymer.

28. A moisture-activated oxygen scavenging composition comprising a polymeric carrier which is permeable to both oxygen and either water or water vapor; an oxygen scavenging material consisting essentially of an ascorbate compound in an amount effective to act as an oxygen scavenger and a catalyzing agent in an amount sufficient to increase the rate of oxygen scavenging by said ascorbate compound, said ascorbate compound and said catalyzing agent being dispersed relatively uniformly as separate components throughout said polymeric carrier; wherein said ascorbate compound is activated for scavenging oxygen by contact with water or water vapor which permeates the carrier; said composition being anhydrous and thereby dormant and substantially non-reactive with oxygen until moisture activated.

29. The composition of claim 6, 24 or 28 wherein the amino polycarboxylic acid chelate is ethylene diamine tetracetic acid.

30. The composition of claim 29 wherein the chelate is in the form of a salt.

31. The composition of claim 30 wherein the transition metal of the chelate is iron or copper.

32. The composition of claim 31 wherein the chelate is $Fe^{++}/EDTA/(2Na^+)$.

33. The composition of claim 32 wherein the chelate is treated to be maintained in a dry state.

34. The composition of claim 33 wherein the dry state is achieved by one of freeze drying, spray drying or microencapsulation.

35. An oxygen scavenging composition in accordance with claim 1 wherein said catalyzing agent is selected from the group consisting of iron chloride and copper sulfate.

* * * * *